No. 741,695. PATENTED OCT. 20, 1903.
H. G. MUTSCHLER.
CAMERA.
APPLICATION FILED APR. 4, 1903.
NO MODEL. 2 SHEETS—SHEET 1.

Witnesses. Inventor.
Robert Everett. Henry G. Mutschler.
James L. Norris, Jr. By James L. Norris
Atty.

No. 741,695. PATENTED OCT. 20, 1903.
H. G. MUTSCHLER.
CAMERA.
APPLICATION FILED APR. 4, 1903.
NO MODEL. 2 SHEETS—SHEET 2.
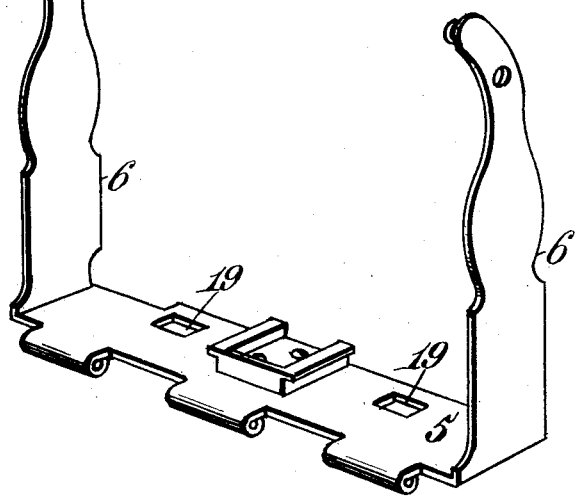
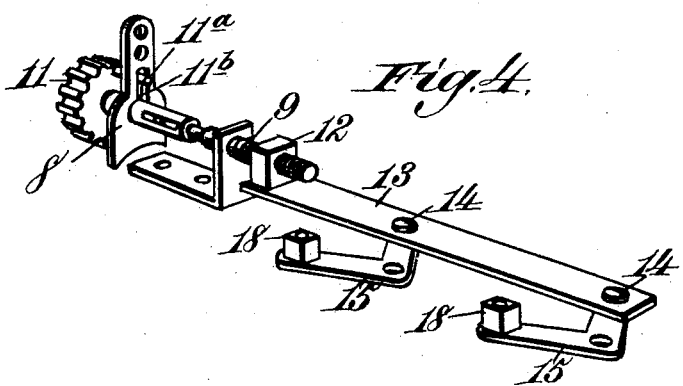

No. 741,695.

Patented October 20, 1903.

UNITED STATES PATENT OFFICE.

HENRY G. MUTSCHLER, OF ROCHESTER, NEW YORK, ASSIGNOR, BY MESNE ASSIGNMENTS, TO ROCHESTER OPTICAL COMPANY, OF ROCHESTER, NEW YORK, A CORPORATION OF NEW YORK.

CAMERA.

SPECIFICATION forming part of Letters Patent No. 741,695, dated October 20, 1903.

Application filed April 4, 1903. Serial No. 151,180. (No model.)

*To all whom it may concern:*

Be it known that I, HENRY G. MUTSCHLER, a citizen of the United States, residing at Rochester, in the county of Monroe and State of New York, have invented new and useful Improvements in Cameras, of which the following is a specification.

This invention relates to photographic cameras, and has for its object to provide improved means for adjustably swinging either the back, which carries the plate or film-holding portion of the camera, or the camera-bed to take in more or less of the sky or foreground and to enable a tall object being photographed to appear in the picture in proper perspective.

To these ends my invention consists in the features and in the construction, combination, and arrangement of parts hereinafter described and claimed, reference being had to the accompanying drawings, forming a part of this specification, wherein—

Figure 1:
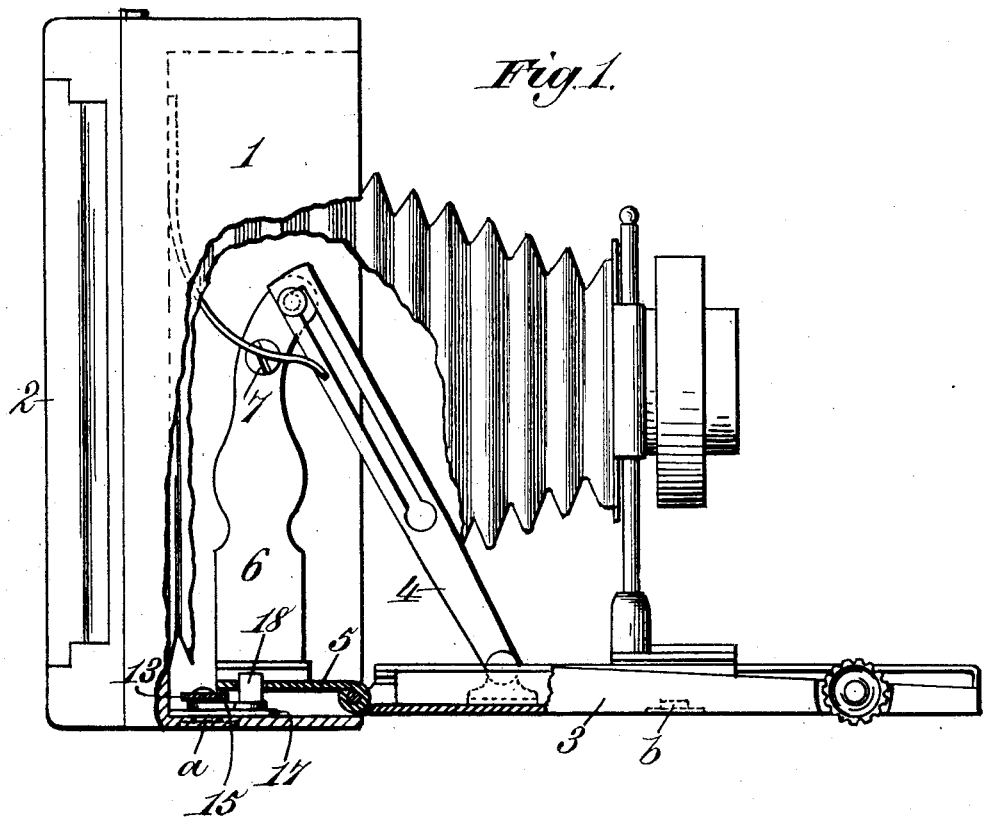
Figure 2:
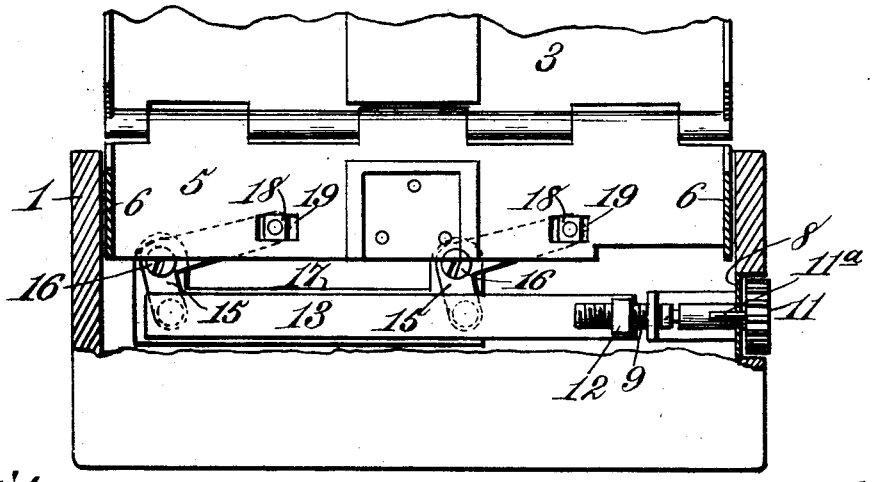

Figure 1 is a view of a camera, partly in side elevation and partly in section, embodying my invention. Fig. 2 is a top plan view illustrating my invention. Fig. 3 is a perspective view of the arms for connecting the camera bed and back. Fig. 4 is a detail perspective of the improved means for swinging the camera back or bed.

According to my invention either the camera-back or the camera-bed may be provided with the usual means for attachment to the tripod, or both may be provided with such means, so that either thereof may be attached to the tripod. Therefore if the camera-bed is fixed to the tripod the camera-back will be caused to swing to secure the relative adjustment desired, or if the camera-back is attached to the tripod the bed will be caused to swing to secure such adjustment.

Referring to the drawings, the numeral 1 indicates the box or casing of the camera; 2, the back proper thereof, provided with means for holding the plate or film holder, and it may have the usual means $a$ for attachment to a tripod.

3 designates the bed of the camera, which may be provided with usual means $b$ for attachment to a tripod. It is hinged relatively to the camera-casing 1, whereby when the camera is not in use the bed may be swung up to a vertical position and form a closure for the camera-casing. Locking means 4 of any suitable or usual construction are provided for locking the bed rigidly in place in a proper position relatively to the camera-casing when the camera is in use.

All of the foregoing parts are of any usual or suitable construction and form no part of the present invention.

Arranged in the bottom of the casing 1, but unattached thereto, is a plate 5, which at its opposite ends is provided with upwardly-projecting arms 6, that are pivoted at their upper ends by screws or pivot-pins 7 to the inner faces of the sides of the camera-casing. The forward edge of the plate 5 is hinged to the rear edge of the bed 3 to permit the said bed being folded up and inclosed within the camera-box and to permit of it being folded down into a horizontal position when the camera is to be used.

A bracket 8 is secured in the camera-casing at one side, and mounted or supported in said bracket is a rotatable manipulating-spindle 9, provided at its exposed end with a knob 11, by means of which it may be conveniently rotated, and the spindle is preferably and as shown a two-part spindle, one part being slidable upon the other, so that the knob may be housed in the camera box or casing when it is not desired to relatively adjust the camera back and bed, and may be pulled outward, so that it may be in convenient reach when it is desired to adjust said parts. The knob is also provided with a laterally-projecting pin $11^a$, which when the parts are in normal position, such as should be when the camera is not in use, registers with a slot $11^b$ in the bracket 8 to enable the knob to be pushed in or housed, as above explained. Until this pin and slot register the knob cannot be housed, and therefore the pin and slot referred to serve as a guide to inform the operator that the parts are in proper relative position, and, on the other hand, guard against the parts becoming deranged or injured by attempting to slide the lens-carriage into the casing when the parts are not in proper position to do so.

The threaded end of the spindle 9 passes through and engages a nut 12, attached to one end of a plate 13, which is arranged transversely in the bottom of the camera-casing, but unattached thereto. Pivoted, as at 14, to the plate 13 are two bell-crank levers 15, which at their elbows are pivoted by screws or pivot-pins 16 to the bottom of the camera-casing or to a plate 17 attached to said bottom. The other ends of the bell-crank levers have pivoted thereto rectangular blocks 18, which are movable in elongated slots 19, formed in the plate 5, before referred to.

The operation of my invention is as follows: Let it be assumed that the bed 3 has been thrown down and it or the camera-back attached to a tripod and it is desired to relatively adjust the camera back and bed for the purpose hereinbefore set forth. It is only necessary to turn the spindle 9, whereupon the threaded portion of said spindle, turning in the nut 12, will move the plate 13 longitudinally in one direction or the other and will swing the bell-crank levers 15 about their fulcrums 14. The blocks 18, pivoted on the ends of said elbow-levers, will have a limited movement in the slots 19 of the plate 5, hinged to the bed, and inasmuch as the said bell-crank levers are fulcrumed at points 16 to the bottom of the camera box or casing and as said bell-crank levers are swung about their pivots 14 by the movement of the plate 13 the camera-back or the camera-bed will be given the desired angular relative adjustment and will maintain the adjusted position until altered at the will of the operator.

Having thus described my invention, what I claim as new, and desire to secure by Letters Patent, is—

1. In a photographic camera, the combination with a camera back and bed, pivotally connected together, of levers fulcrumed intermediate their ends to the back, said levers at one end being connected to a part of the bed and at their opposite ends to an endwise-movable plate, and means for longitudinally moving the plate to turn the levers on their fulcrums, substantially as described.

2. In a photographic camera, the combination with a camera back and bed, pivotally connected together, of bell-crank levers fulcrumed at their elbows to the bottom of the back and pivotally connected at their forward ends to a part of the bed, an endwise-movable plate connected to the other ends of said levers, and means for longitudinally moving the plate to turn the levers on their fulcrums, substantially as described.

3. In a photographic camera, the combination with a camera back and bed, pivotally connected together, of bell-crank levers fulcrumed at their elbows to the bottom of the box or casing, angular blocks pivotally attached to the forward ends of said levers and movably arranged in elongated slots formed in a part of the bed, an endwise-movable plate pivotally attached to the rear ends of said levers, and means for longitudinally moving the plate to turn the levers on their fulcrums, substantially as described.

4. In a photographic camera, the combination with a camera back and bed, pivotally connected together, of bell-crank levers fulcrumed at their elbows to the bottom of the box or casing and pivotally connected at their forward ends to a part of the said bed, an endwise-movable plate pivotally connected to the rear ends of said levers, a nut on said plate, and a rotatable spindle threaded at one end and engaging said nut and projecting at its other end through the box or casing and provided with means for turning the same, substantially as described.

5. In a photographic camera, the combination with a camera back and bed, pivotally connected together, of bell-crank levers fulcrumed at their elbows to the bottom of the box or casing and pivotally connected at their forward ends to a part of the said bed, an endwise-movable plate pivotally connected to the rear ends of said levers and provided with a nut, a bracket fixed to the bottom of the box or casing, a spindle rotatable in said bracket engaging said nut and having an end projecting through the camera box or casing and provided with a knob, substantially as described.

6. In a photographic camera, the combination with a camera back and bed, of a plate hinged to the rear edge of said bed and provided with two upwardly-projecting arms, pivotally connected to the camera-back, bell-crank levers fulcrumed at their elbows to the bottom of the box or casing and pivotally connected at their forward ends to the said plate, an endwise-movable plate pivotally connected to the rear ends of said levers, a nut attached to said last-named plate, a rotatable spindle passing through the side of the camera box or casing and having a threaded end engaging said nut, and means for turning said spindle, substantially as described.

In testimony whereof I have hereunto set my hand in presence of two subscribing witnesses.

HENRY G. MUTSCHLER.

Witnesses:
MERRITT R. BURTON,
ALBERT MUTSCHLER.